(12) United States Patent
Sadohara et al.

(10) Patent No.: US 9,876,423 B2
(45) Date of Patent: Jan. 23, 2018

(54) DC-TO-DC CONVERTER

(71) Applicant: KABUSHIKI KAISHA YASKAWA DENKI, Kitakyushu-shi (JP)

(72) Inventors: Tadashi Sadohara, Kitakyushu (JP); Seiji Hashimoto, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/162,621

(22) Filed: May 24, 2016

(65) Prior Publication Data

US 2016/0268895 A1 Sep. 15, 2016

Related U.S. Application Data

(63) Continuation of application No. PCT/JP2013/082079, filed on Nov. 28, 2013.

(51) Int. Cl.
*H02M 3/156* (2006.01)
*H02M 3/158* (2006.01)
(Continued)

(52) U.S. Cl.
CPC ............. *H02M 3/156* (2013.01); *H02M 1/08* (2013.01); *H02M 1/34* (2013.01); *H02M 3/158* (2013.01);
(Continued)

(58) Field of Classification Search
CPC ........ H02M 3/07; H02M 3/156; H02M 3/158; H02M 3/1584; H02M 1/08; H02M 1/34; H02M 2001/342; Y02B 70/1491
See application file for complete search history.

(56) References Cited

U.S. PATENT DOCUMENTS 5,486,752 A * 1/1996 Hua .................. H02M 3/158
323/222
5,914,587 A * 6/1999 Liu .................. H02M 3/158
323/222
(Continued)

FOREIGN PATENT DOCUMENTS

JP 10-285915 10/1998
JP 2004-201369 7/2004
(Continued)

OTHER PUBLICATIONS

International Search Report for corresponding International Application No. PCT/JP2013/082079, dated Mar. 4, 2014.
(Continued)

*Primary Examiner* — Jue Zhang
(74) *Attorney, Agent, or Firm* — Mori & Ward, LLP (57) ABSTRACT

A DC-to-DC converter includes an input terminal connected to a DC power source. An output terminal is connected to a load. A reactor is disposed between the input terminal and the output terminal. A blocking diode is connected in series to the reactor. A switching element has one end connected between the reactor and the blocking diode. A boost chopper circuit boosts an input voltage to generate an output voltage. A first reactor is disposed between the input terminal and the one end. A first capacitor is disposed between the first reactor and the switching element and connected in series to the first reactor. A first diode includes an anode terminal and a cathode terminal. The anode terminal is connected to a connection portion of the first reactor and the first capacitor. The cathode terminal is connected to the output terminal.

21 Claims, 5 Drawing Sheets

(51) Int. Cl.
  *H02M 1/08*   (2006.01)
  *H02M 3/07*   (2006.01)
  *H02M 1/34*   (2007.01)

(52) U.S. Cl.
  CPC ............ *H02M 3/07* (2013.01); *H02M 3/1584* (2013.01); *H02M 2001/342* (2013.01); *Y02B 70/1491* (2013.01)

(56) References Cited

U.S. PATENT DOCUMENTS

| | | | | |
|---|---|---|---|---|
| 5,959,438 | A * | 9/1999 | Jovanovic | H02M 1/34 323/222 |
| 6,051,961 | A * | 4/2000 | Jang | H02M 3/158 323/224 |
| 6,060,867 | A * | 5/2000 | Farrington | H02M 1/34 323/222 |
| 6,236,191 | B1 * | 5/2001 | Chaffai | H02M 1/34 323/222 |
| 6,522,109 | B2 * | 2/2003 | Tanaka | H02M 1/34 323/222 |
| 2008/0169792 | A1 | 7/2008 | Orr | |
| 2012/0068678 | A1 | 3/2012 | Hatae et al. | |
| 2013/0257393 | A1 | 10/2013 | Hosotani | |

FOREIGN PATENT DOCUMENTS

| | | |
|---|---|---|
| JP | 2010-516223 | 5/2010 |
| JP | 2012-70505 | 4/2012 |
| JP | 2013-207894 | 10/2013 |

OTHER PUBLICATIONS

Written Opinion for corresponding International Application No. PCT/JP2013/082079, dated Mar. 4, 2014.

* cited by examiner

DC-TO-DC CONVERTER

CROSS-REFERENCE TO RELATED APPLICATIONS

The present application is a continuation application of International Application No. PCT/JP2013/082079, filed Nov. 28, 2013. The contents of this application are incorporated herein by reference in their entirety.

BACKGROUND

Field of the Invention

The embodiments disclosed herein relate to a DC-to-DC converter.

Discussion of the Background

Japanese Unexamined Patent Application Publication No. 2012-70505 discloses a boost DC-to-DC converter that steps up its input voltage by turning on and off a switching element periodically. Soft-switching is employed to turn on and off the switching element so as to reduce switching losses.

SUMMARY

According to one aspect of the present disclosure, a DC-to-DC converter includes an input terminal, an output terminal, a reactor, a blocking diode, a switching element, a boost chopper circuit, a first reactor, a first capacitor, and a first diode. The input terminal is connected to a DC power source. The output terminal is connected to a load. The reactor is disposed between the input terminal and the output terminal. The blocking diode is connected in series to the reactor. The switching element has one end connected between the reactor and the blocking diode. The boost chopper circuit is configured to boost an input voltage so as to generate an output voltage. The first reactor is disposed between the input terminal and the one end of the switching element. The first capacitor is disposed between the first reactor and the switching element and connected in series to the first reactor. The first diode includes an anode terminal and a cathode terminal. The anode terminal is connected to a connection portion at which the first reactor and the first capacitor are connected to each other. The cathode terminal is connected to the output terminal.

According to another aspect of the present disclosure, a DC-to-DC converter includes a booster and a voltage suppressor. The booster is configured to turn on and off a switching element to switch between accumulating, in a reactor, energy supplied from a DC power source and releasing the energy from the reactor so as to boost a voltage output from the DC power source. The voltage suppressor is configured to, when the switching element is turned off, suppress a voltage across the switching element based on energy supplied from the DC power source when the switching element is on.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 2 illustrates how current flows through the DC-to-DC converter when a switching element according to the first embodiment is on;

FIG. 8 illustrates how current flows through the DC-to-DC converter when the second switching element according to the second embodiment is on.

DESCRIPTION OF THE EMBODIMENTS

By referring to the accompanying drawings, DC-to-DC converters according to embodiments will be described in detail below. It is noted that the following embodiments are provided for exemplary purposes only and are not intended in a limiting sense.

First Embodiment

Figure 1:
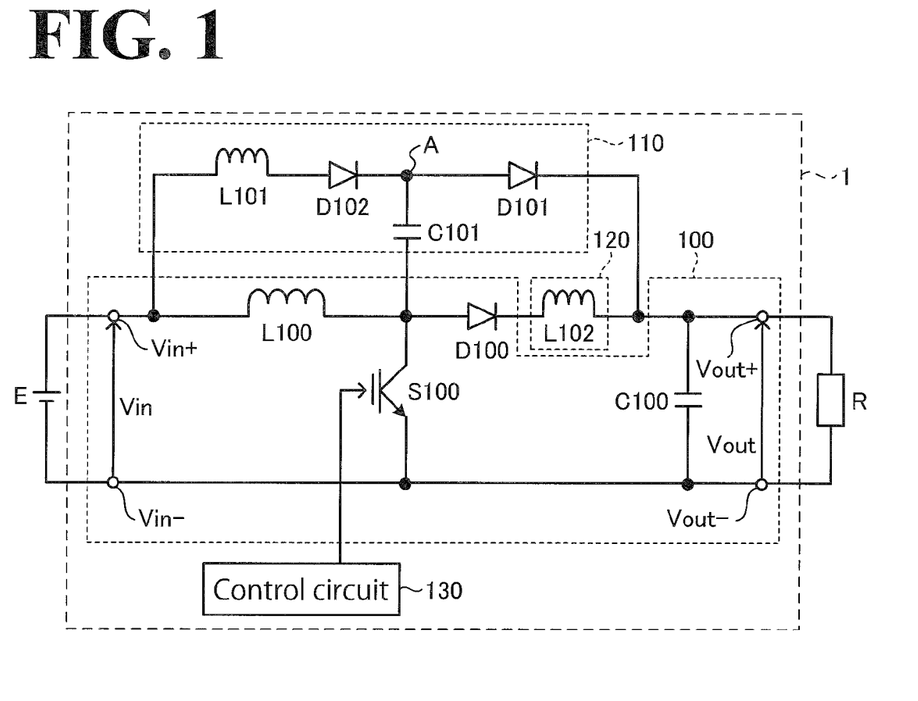
FIG. 1 illustrates a DC-to-DC converter according to a first embodiment.

FIG. 1 is a circuit diagram of a DC-to-DC converter 1 according to this embodiment. The DC-to-DC converter 1 includes a boost chopper circuit 100, a ZVS (Zero Voltage Switching) circuit 110, a ZCS (Zero Current Switching) circuit 120, and a control circuit 130.

The boost chopper circuit 100 includes a positive input terminal $V_{in+}$, a negative input terminal $V_{in-}$, a positive output terminal $V_{out+}$, a negative output terminal $V_{out-}$, a reactor L100, a blocking diode D100, a switching element S100, and a smoothing capacitor C100.

The boost chopper circuit 100 turns the switching element S100 on and off to switch between accumulating, in the reactor L100, energy supplied from a DC (direct-current) power source E and releasing the energy from the reactor L100. In this manner, the boost chopper circuit 100 boosts the voltage output from the DC power source E.

The boost chopper circuit 100 boosts the voltage between the positive input terminal $V_{in+}$ and the negative input terminal $V_{in-}$ (this voltage being hereinafter referred to as input voltage $V_{in}$) to generate output voltage $V_{out}$. The output voltage $V_{out}$ is applied to a load R through the positive output terminal $V_{out+}$ and the negative output terminal $V_{out-}$.

The positive input terminal $V_{in+}$ is connected to the positive pole of the DC power source E. The negative input terminal $V_{in-}$ is connected to the negative pole of the DC power source E. The positive output terminal $V_{out+}$ is connected to the positive pole of the load R. The negative output terminal $V_{out-}$ is connected to the negative pole of the load R.

In the embodiment of FIG. 1, the negative pole of the DC power source E is at ground potential of the DC-to-DC converter 1. The negative output terminal $V_{out-}$ is connected to the ground potential.

The reactor L100 is disposed between the positive input terminal $V_{in+}$ and the positive output terminal $V_{out+}$. In the boost chopper circuit 100 illustrated in FIG. 1, the reactor L100 has one end connected to the positive input terminal $V_{in+}$ and another end connected to the anode terminal of the blocking diode D100.

The blocking diode D100 is connected in series to the reactor L100. As illustrated in FIG. 1, the blocking diode D100 has its anode terminal connected to the reactor L100, and the blocking diode D100 has its cathode terminal connected to the positive output terminal $V_{out+}$.

The blocking diode D100 is a backflow prevention diode to prevent current from flowing backwards, that is, flowing from the positive output terminal $V_{out+}$ to the positive input terminal $V_{in+}$.

The switching element S100 has one end connected between the reactor L100 and the blocking diode D100. The switching element S100 has another end connected to the ground potential.

Based on a control signal from the control circuit 130, the switching element S100 switches between connection and disconnection of the another end of the reactor L100 to and from the negative input terminal $V_{in-}$. In the embodiment of FIG. 1, the switching element S100 is a bipolar transistor. A bipolar transistor, however, should not be construed as limiting the switching element S100. Another non-limiting example of the switching element S100 is a MOSFET (Metal-Oxide-Semiconductor Field-Effect Transistor).

In the case where the switching element S100 is a bipolar transistor, the collector terminal of the switching element S100 is connected between the reactor L100 and the blocking diode D100, and the emitter terminal of the switching element S100 is connected to the ground potential. The base terminal of the switching element S100 serves as a control terminal connected to the control circuit 130.

The smoothing capacitor C100 has one end connected to the positive output terminal $V_{out+}$ and another end connected to the negative output terminal $V_{out-}$. The smoothing capacitor C100 smoothes the output voltage $V_{out}$. In the embodiment of FIG. 1, the DC-to-DC converter 1 incorporates the smoothing capacitor C100. Another possible embodiment is that the load R incorporates the smoothing capacitor C100.

The ZVS circuit 110 is a circuit dedicated to soft-switching for the switching element S100 to perform at the turn-off time of the switching element S100. Based on energy supplied from the DC power source E when the switching element S100 is on, the ZVS circuit 110 suppresses the voltage across the switching element S100 at the turn-off time of the switching element S100. This configuration eliminates or minimizes switching losses that can occur in the switching element S100. The elimination or minimization of switching losses realized by the ZVS circuit 110 will be detailed later.

The ZVS circuit 110 includes a first reactor L101, a first capacitor C101, a first diode D101, and a second diode D102.

The first reactor L101 is disposed between the positive input terminal $V_{in+}$ and the one end of the switching element S100. As illustrated in FIG. 1, the first reactor L101 has one end connected to the positive input terminal $V_{in+}$ and another end connected to the anode terminal of the second diode D102.

The first capacitor C101 is disposed between the first reactor L101 and the switching element S100 and connected in series to the first reactor L101. As illustrated in FIG. 1, the first capacitor C101 has one end connected to the cathode terminal of the second diode D102 and another end connected to the one end of the switching element S100. Thus, the first capacitor C101 illustrated in FIG. 1 is connected in series to the first reactor L101 through the second diode D102.

The first diode D101 has its anode terminal connected to a connection portion A, at which the first reactor L101 and the first capacitor C101 are connected to each other. The first diode D101 has its cathode terminal connected to the positive output terminal $V_{out+}$. The first diode D101 is a discharging diode for the first capacitor C101.

As illustrated in FIG. 1, the first reactor L101 and the first capacitor C101 are connected in series to each other through the second diode D102. Here, the connection portion A is where the cathode terminal of the second diode D102 and the one end of the first capacitor C101 are connected each other. Specifically, the anode terminal of the first diode D101 is connected to the another end of the first reactor L101 through the second diode D102 and connected to the one end of the first capacitor C101.

The second diode D102 is connected in series to the first reactor L101. As illustrated in FIG. 1, the second diode D102 has its anode terminal connected to the another end of the first reactor L101, and the second diode D102 has its cathode terminal connected to the one end of the first capacitor C101.

The second diode D102 is a backflow prevention diode to prevent current from flowing backwards, that is, flowing from the first capacitor C101 to the first reactor L101. In the embodiment of FIG. 1, the second diode D102 is disposed between the first reactor L101 and the first capacitor C101. Another possible embodiment is that the second diode D102 is disposed between the first reactor L101 and the positive input terminal $V_{in+}$. Still another possible embodiment is that no second diode D102 is provided.

In this case, the connection portion A is where the another end of the first reactor L101 and the one end of the first capacitor C101 are connected each other. Thus, the anode terminal of the first diode D101 is connected to the another end of the first reactor L101 and connected to the one end of the first capacitor C101.

The ZCS circuit 120 is a circuit dedicated to soft-switching for the switching element S100 to perform at the turn-on time of the switching element S100. Providing the ZCS circuit 120 eliminates or minimizes switching losses that can occur in the switching element S100. The elimination or minimization of switching losses realized by the ZCS circuit 120 will be detailed later.

The ZCS circuit 120 includes a second reactor L102. The second reactor L102 is disposed between the blocking diode D100 and the positive output terminal $V_{out+}$. As illustrated in FIG. 1, the second reactor L102 has one end connected to the cathode terminal of the blocking diode D100 and another end connected to the positive output terminal $V_{out+}$.

By referring to FIGS. 2 to 5, description will be made with regard to how current flows through the DC-to-DC converter 1 when the switching element S100 is switched on and off. In FIGS. 2 to 5, the control circuit 130 is not illustrated for simplicity reasons.

When Switching Element S100 is On

Figure 2:
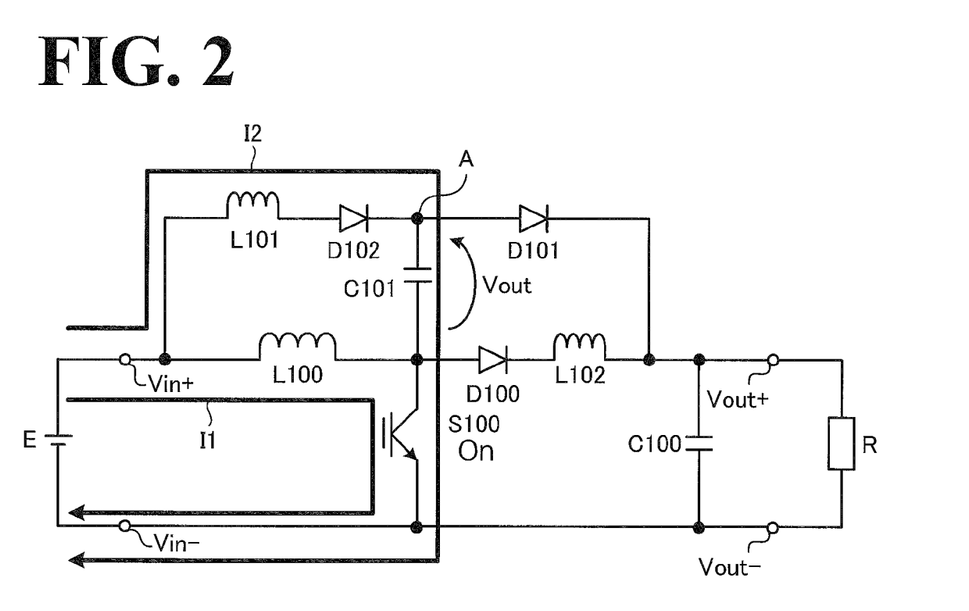

FIG. 2 is a diagram illustrating the DC-to-DC converter 1 with the switching element S100 on. The arrows illustrated in FIG. 2 indicate paths through which current flows in the DC-to-DC converter 1.

When the switching element S100 is on, the another end of the reactor L100 is connected to the ground potential through the switching element S100. This causes the current, I1, flowing from the positive pole of the DC power source E to the reactor L100 to pass through the switching element S100 into the ground potential. In this manner, the reactor L100 accumulates magnetic field energy.

Also when the switching element S100 is on, the another end of the first capacitor C101 is connected to the ground potential through the switching element S100. This causes the current, I2, flowing from the positive pole of the DC power source E to the first reactor L101 to pass through the second diode D102, the first capacitor C101, and the switching element S100 into the ground potential.

The first capacitor C101 is supplied energy from the first reactor L101 and accumulates electric charge. In this embodiment, the first reactor L101 and the first capacitor C101 are set to have suitable values that make the voltage across the first capacitor C101 equal or similar to the output voltage $V_{out}$.

When Switching Element S100 is Switched from ON to OFF

Figure 3:
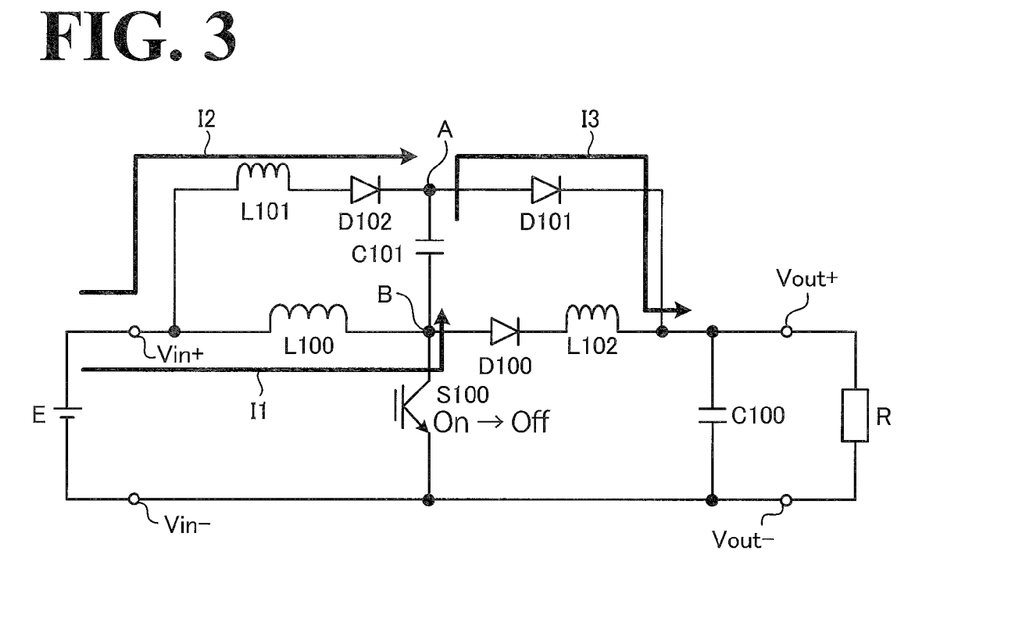
FIG. 3 illustrates how current flows through the DC-to-DC converter at turn-off time of the switching element according to the first embodiment.

By referring to FIG. 3, description will be made with regard to a transient state in which the switching element S100 is switched from ON to OFF. FIG. 3 is a diagram illustrating the DC-to-DC converter 1 at the turn-off time of the switching element S100, that is, at the time when the switching element S100 is switched from ON to OFF. The arrows illustrated in FIG. 3 indicate paths through which current flows through the DC-to-DC converter 1 at the turn-off time of the switching element S100.

At the turn-off time of the switching element S100, the first capacitor C101 starts discharging electricity. This causes current, I3, to flow from the first capacitor C101 to the first diode D101, in the DC-to-DC converter 1.

The current I1, which is flowing through the reactor L100, continues flowing even when the switching element S100 is turned off. At the turn-off time of the switching element S100, the current I1 from the positive pole of the DC power source E flows through the reactor L100 to the another end of the first capacitor C101.

The current I2, which is flowing through the first reactor L101, continues flowing even when the switching element S100 is turned off. The current I2 from the positive pole of the DC power source E flows through the first reactor L101 and the second diode D102 to the connection portion A.

Description will be made with regard to the elimination or minimization of switching losses in the switching element S100 realized by the ZVS circuit 110.

Electric charge is accumulated on the first capacitor C101 while the switching element S100 is on. This configuration makes the voltage across the first capacitor C101 equal or similar to the output voltage $V_{out}$. This makes the potential of a connection portion B equal or similar to the ground potential at the turn-off time of the switching element S100.

As a result, both ends of the switching element S100 have potentials equal or similar to the ground potential, and the voltage across the switching element S100 is approximately zero. This configuration enables the DC-to-DC converter 1 to perform zero voltage switching and thus eliminate or minimize switching losses that can occur in the switching element S100 at the turn-off time of the switching element S100.

In performing the boost operation by soft-switching, the DC-to-DC converter 1 according to this embodiment can be rephrased as using a circuit that includes the first reactor L101, the first capacitor C101, the first diode D101, and the switching element S100.

In this embodiment, the first reactor L101 and the first capacitor C101 are set to have suitable values that make the voltage across the first capacitor C101 equal or similar to the output voltage $V_{out}$. This configuration, however, should not be construed as limiting the voltage across the first capacitor C101. Any other configuration is possible insofar as the configuration makes, by accumulating electric charge on the first capacitor C101, the voltage across the switching element S100 lower than the output voltage $V_{out}$ at the turn-off time of the switching element S100. By suppressing the voltage across the switching element S100 at the turn-off time of the switching element S100, the DC-to-DC converter 1 is able to perform soft-switching and thus eliminate or minimize a switching loss corresponding to the voltage across the first capacitor C101.

When Switching Element S100 is OFF

Figure 4:
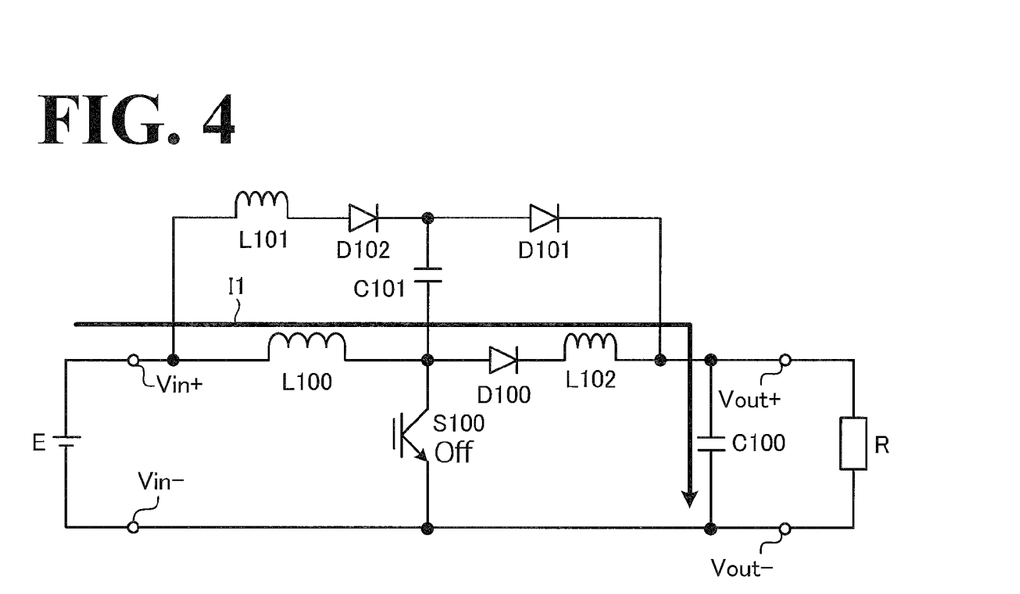
FIG. 4 illustrates how current flows through the DC-to-DC converter when the switching element according to the first embodiment is off.

By referring to FIG. 4, the DC-to-DC converter 1 with the switching element S100 off will be described. FIG. 4 is a diagram illustrating the DC-to-DC converter 1 with the switching element S100 off. The arrows illustrated in FIG. 4 indicate paths through which current flows through the DC-to-DC converter 1.

When the DC-to-DC converter 1 is in a steady state after completion of discharge from the first capacitor C101, the current I1 flows from the positive pole of the DC power source E to the reactor L100. The current I1 from the positive pole of the DC power source E flows to the reactor L100, the blocking diode D100, and the second reactor L102. Here, magnetic field energy is accumulated on the second reactor L102.

When Switching Element S100 is Switched from OFF to ON

Figure 5:
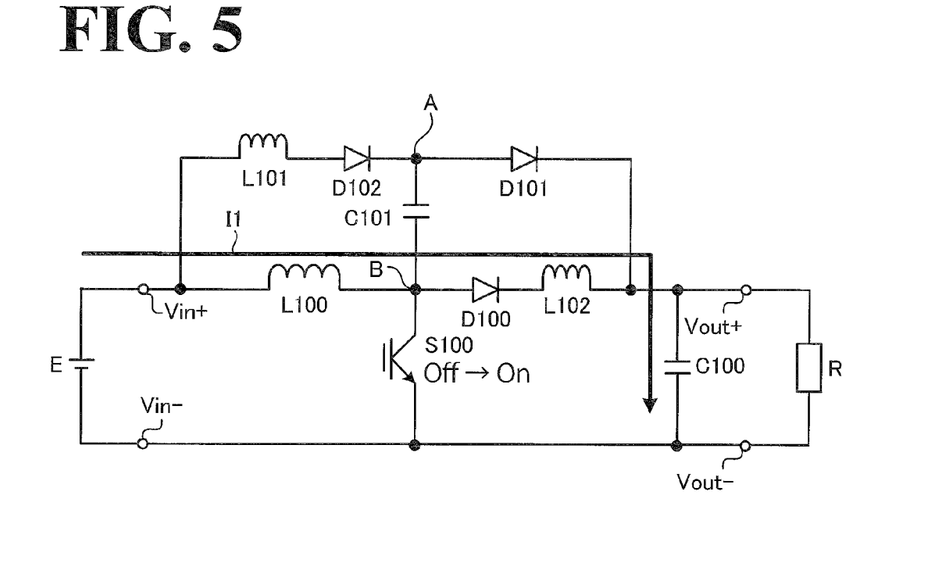
FIG. 5 illustrates how current flows through the DC-to-DC converter at turn-on time of the switching element according to the first embodiment.

By referring to FIG. 5, description will be made with regard to a transient state in which the switching element S100 is switched from OFF to ON. FIG. 5 is a diagram illustrating the DC-to-DC converter 1 at the turn-on time of the switching element S100, that is, at the time when the switching element S100 is switched from OFF to ON. The arrows illustrated in FIG. 5 indicate paths through which current flows through the DC-to-DC converter 1 at the turn-on time of the switching element S100.

At the turn-on time of the switching element S100, that is, at the time when the switching element S100 is switched from OFF to ON, the another end of the reactor L100 is connected to the ground potential through the switching element S100.

In the case of a DC-to-DC converter without the ZCS circuit 120, the current I1, which is flowing through the reactor L100, flows to the switching element S100 at the turn-on time of the switching element S100. This causes a switching loss to occur that corresponds to the current I1 flowing through the switching element S100.

The DC-to-DC converter 1 includes the second reactor L102. The second reactor L102 is the ZCS circuit 120. Even at the turn-on time of the switching element S100, the second reactor L102 causes the current I1 to flow through the blocking diode D100 and the second reactor L102.

Thus, no current flows through the switching element S100 at the turn-on time of the switching element S100. This ensures that no switching loss occurs at the time when the switching element S100 is switched from OFF to ON.

In this embodiment, the second reactor L102 is set to have a suitable value that prevents the current I1 from flowing through the switching element S100 at the turn-on time of the switching element S100. This configuration, however, should not be construed in a limiting sense. Any other configuration is possible insofar as current flows through the second reactor L102 to minimize current flowing through the switching element S100 at its turn-off time. This configuration enables the DC-to-DC converter 1 to perform soft-switching so as to eliminate or minimize a switching loss corresponding to the current flowing through the first reactor L102.

Thus, the DC-to-DC converter 1 according to this embodiment includes the second reactor L102, which serves as the ZCS circuit 120. This configuration eliminates or minimizes a switching loss that can occur at the time when the switching element S100 is switched from OFF to ON.

Thus, the DC-to-DC converter 1 according to this embodiment includes the ZVS circuit 110. This configuration eliminates or minimizes a switching loss that can occur at the turn-on time of the switching element S100.

Also in the DC-to-DC converter 1, energy accumulated in the ZVS circuit 110 to implement soft-switching of the switching element S100 is released toward the positive output terminal $V_{out+}$. This configuration eliminates or minimizes a loss that is due to the soft-switching.

The DC-to-DC converter 1 also includes the ZCS circuit 120, in addition to the ZVS circuit 110. This configuration eliminates or minimizes a switching loss that can occur at the time when the switching element S100 is switched from OFF to ON.

Also in the DC-to-DC converter 1, no reverse current flows to the second reactor L102 when the first capacitor C101 is charged. Without reverse current, no time is necessary for cancelling reverse current, and thus the DC-to-DC converter 1 finds a wide range of applications.

Second Embodiment

By referring to FIGS. 6 to 9, a DC-to-DC converter 2 according to the second embodiment will be described.

The DC-to-DC converter 1 illustrated in FIG. 1 includes the second reactor L102. It is possible that surge voltage occurs in the second reactor L102.

The surge voltage is determined by the potential, Ldi/dt, of both ends of the second reactor L102. Thus, the surge voltage occurs when the switching element S100 is switched from ON to OFF and when the current flowing through the switching element S100 moves to the second reactor L102.

The second reactor L102 is much smaller in size than the reactor L100. The DC-to-DC converter 1 illustrated in FIG. 1 performs zero voltage switching when the switching element S100 is switched from ON to OFF. These configurations make immaterial the value of the surge voltage that occurs at the timing when the switching element S100 is switched from ON to OFF. Thus, the surge voltage is not influential to the DC-to-DC converter 1.

Description will be made with regard to the case where the switching element S100 is switched from OFF to ON, causing all of the current flowing through the second reactor L102 to flow through the switching element S100. In this case, a resonance may occur due to connection capacitance between the second reactor L102 and the blocking diode D100 and due to stray capacitance. Because of the resonance, the surge voltage occurring in the second reactor L102 may become twice as large as the surge voltage in the steady state.

Figure 6:
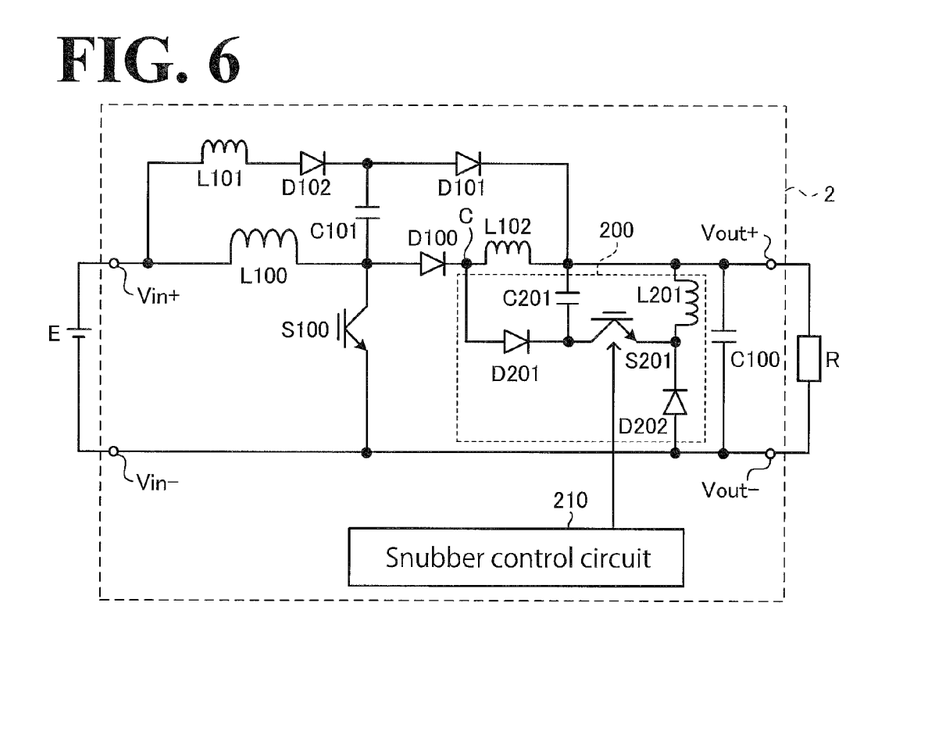
FIG. 6 illustrates a DC-to-DC converter according to a second embodiment.

In view of this situation, the DC-to-DC converter 2 according to this embodiment includes a snubber circuit 200 to absorb the surge voltage.

The DC-to-DC converter 2 illustrated in FIG. 6 includes the snubber circuit 200 and a snubber control circuit 210 in addition to the configuration of the DC-to-DC converter 1 illustrated in FIG. 1. The snubber circuit 200 absorbs the surge voltage occurring in the second reactor L102.

It is noted that the DC-to-DC converter 2 illustrated in FIG. 6 is identical in configuration to the DC-to-DC converter 1 illustrated in FIG. 1 except that the DC-to-DC converter 2 includes the snubber circuit 200 and the snubber control circuit 210. In the following description, components common to the DC-to-DC converter 1 and the DC-to-DC converter 2 will be denoted with the same reference numerals and will not be elaborated here.

The snubber circuit 200 illustrated in FIG. 6 includes a second capacitor C201, a third reactor L201, a third diode D201, a fourth diode D202, and a second switching element S201.

The second capacitor C201 has one end connected to the positive output terminal $V_{out+}$ and another end connected to one end of the second switching element S201. The second capacitor C201 accumulates, in the form of electric charge, the surge voltage occurring in the second reactor L102.

The third diode D201 has its anode terminal connected to a connection portion C, at which the blocking diode D100 and the second reactor L102 are connected to each other, and the third diode D201 has its cathode terminal connected to the another end of the second capacitor C201. The third diode D201 is a backflow prevention diode to prevent the electric charge accumulated on the second capacitor C201 from flowing to the connection portion C.

The third reactor L201 has one end connected to the positive output terminal $V_{out+}$ and another end connected to the cathode terminal of the fourth diode D202.

The fourth diode D202 has its anode terminal connected to the ground potential, and the fourth diode D202 has its cathode terminal connected to the another end of the third reactor L201. Thus, the another end of the third reactor L201 is connected to the ground potential through the fourth diode D202.

The fourth diode D202 is a backflow prevention diode to prevent the electric charge accumulated on the second capacitor C201 from flowing to the ground potential.

The second switching element S201 is disposed between the second capacitor C201 and the fourth diode D202. The second switching element S201 illustrated in FIG. 6 has one end connected to the another end of the second capacitor C201 and another end connected to the cathode terminal of the fourth diode D202. Specifically, the another end of the second switching element S201 is connected to the ground potential through the fourth diode D202.

Based on an instruction from the snubber control circuit 210, the second switching element S201 switches between connection and disconnection of the another end of the second capacitor C201 to and from the ground potential. Specifically, when the second switching element S201 is on, the another end of the second capacitor C201 is connected to the ground potential. When the second switching element S201 is off, the another end of the second capacitor C201 is electrically disconnected from the ground potential.

In the embodiment of FIG. 6, the second switching element S201 is a bipolar transistor. A bipolar transistor, however, should not be construed as limiting the second switching element S201. Another non-limiting example of the second switching element S201 is a MOSFET transistor.

In the case where the second switching element S201 is a bipolar transistor, the collector terminal of the second switching element S201 is connected to the another end of the second capacitor C201, and the emitter terminal of the second switching element S201 is connected to the cathode terminal of the fourth diode D202. The base terminal of the second switching element S201 serves as a control terminal connected to the snubber control circuit 210.

The snubber control circuit 210 controls absorption and release of the surge voltage that the snubber circuit 200 causes to occur in the second reactor L102. Specifically, when the voltage across the snubber circuit 200 becomes higher than a predetermined level of voltage, the snubber control circuit 210 controls the snubber circuit 200 to repeat a cycle of absorption and release of the surge voltage.

In this embodiment, the snubber control circuit 210 uses, for example, a voltage detection circuit (not illustrated) to detect the voltage across the second capacitor C201 so as to detect the voltage across the snubber circuit 200. Based on the detected voltage across the second capacitor C201, the snubber control circuit 210 generates a control signal to switch the second switching element S201 on and off. The snubber control circuit 210 outputs the generated control signal to the second switching element S201 so as to control the second switching element S201.

Figure 7:
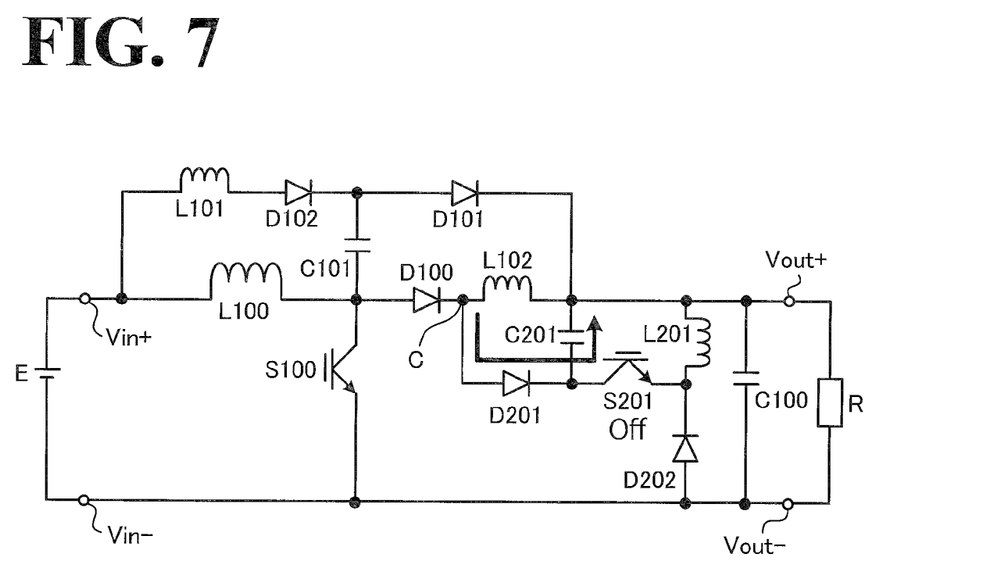
FIG. 7 illustrates how current flows through the DC-to-DC converter when a second switching element according to the second embodiment is off.

By referring to FIGS. 7 to 9, how the snubber circuit 200 operates will be described. FIG. 7 is a diagram illustrating a path through which current flows in the snubber circuit 200 when the second switching element S201 is off. In FIG. 7, the snubber control circuit 210 is not illustrated.

When the second switching element S201 is off, the second capacitor C201 is connected in parallel to the second reactor L102. As illustrated in FIG. 7, in the snubber circuit 200, this configuration causes current from the connection portion C to pass through the third diode D201 into the second capacitor C201. In this manner, the second capacitor C201 accumulates electric charge.

Figure 8:
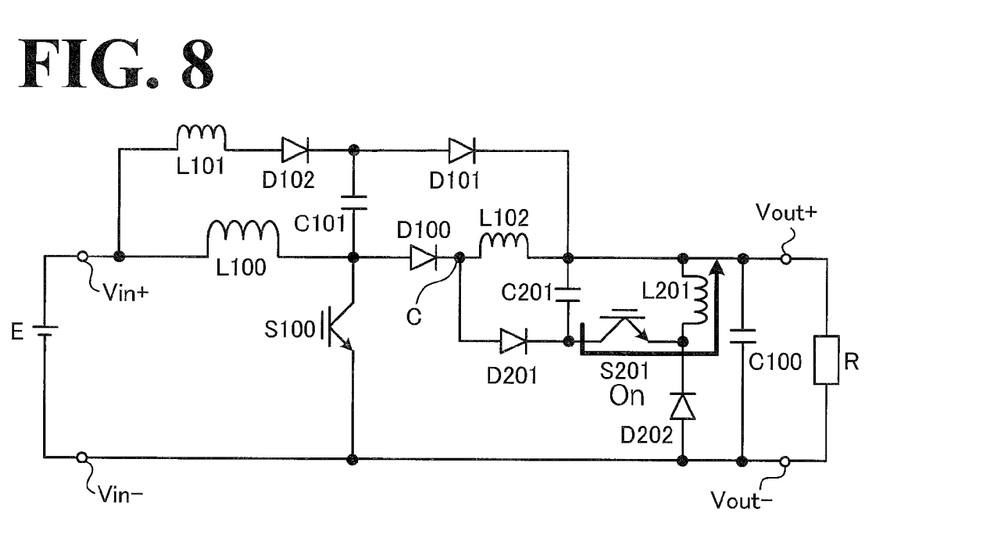

FIG. 8 is a diagram illustrating a path through which current flows in the snubber circuit 200 when the second switching element S201 is on. In FIG. 8, the snubber control circuit 210 is not illustrated.

When the second switching element S201 is on, the another end of the second capacitor C201 is connected to the ground potential. As illustrated in FIG. 8, in the snubber circuit 200, this configuration causes current from the another end of the second capacitor C201 to pass through the second switching element S201 and the third reactor L201 into the positive output terminal $V_{out+}$. Thus, when the second switching element S201 is on, the second capacitor C201 releases the accumulated electric charge to the positive output terminal $V_{out+}$.

By referring to FIG. 9, timing at which to switch the second switching element S201 on and off will be described. FIG. 9 illustrates the input voltage $V_{in}$ and the output voltage $V_{out}$ of the DC-to-DC converter 2, the voltage across the second capacitor C201, a control signal of the switching element S100, and a control signal of the second switching element S201.

The positive input terminal $V_{in+}$ and the negative input terminal $V_{in-}$ of the DC-to-DC converter 2 are connected to the DC power source E. Since the DC power source E has a voltage of Ve, the input voltage $V_{in}$ is at constant voltage Ve.

During the time when the DC-to-DC converter 2 is not performing a boost operation (the time before timing T1 illustrated in FIG. 9), the output voltage $V_{out}$ is at the voltage Ve, which is equal to the input voltage $V_{in}$. When the switching element S100 repeats a cycle of ON and OFF on a constant periodic basis based on the control signal from the control circuit 130 (after timing T1 illustrated in FIG. 9), the DC-to-DC converter 2 performs a boost operation to boost the output voltage $V_{out}$ to voltage Vr.

Figure 9:
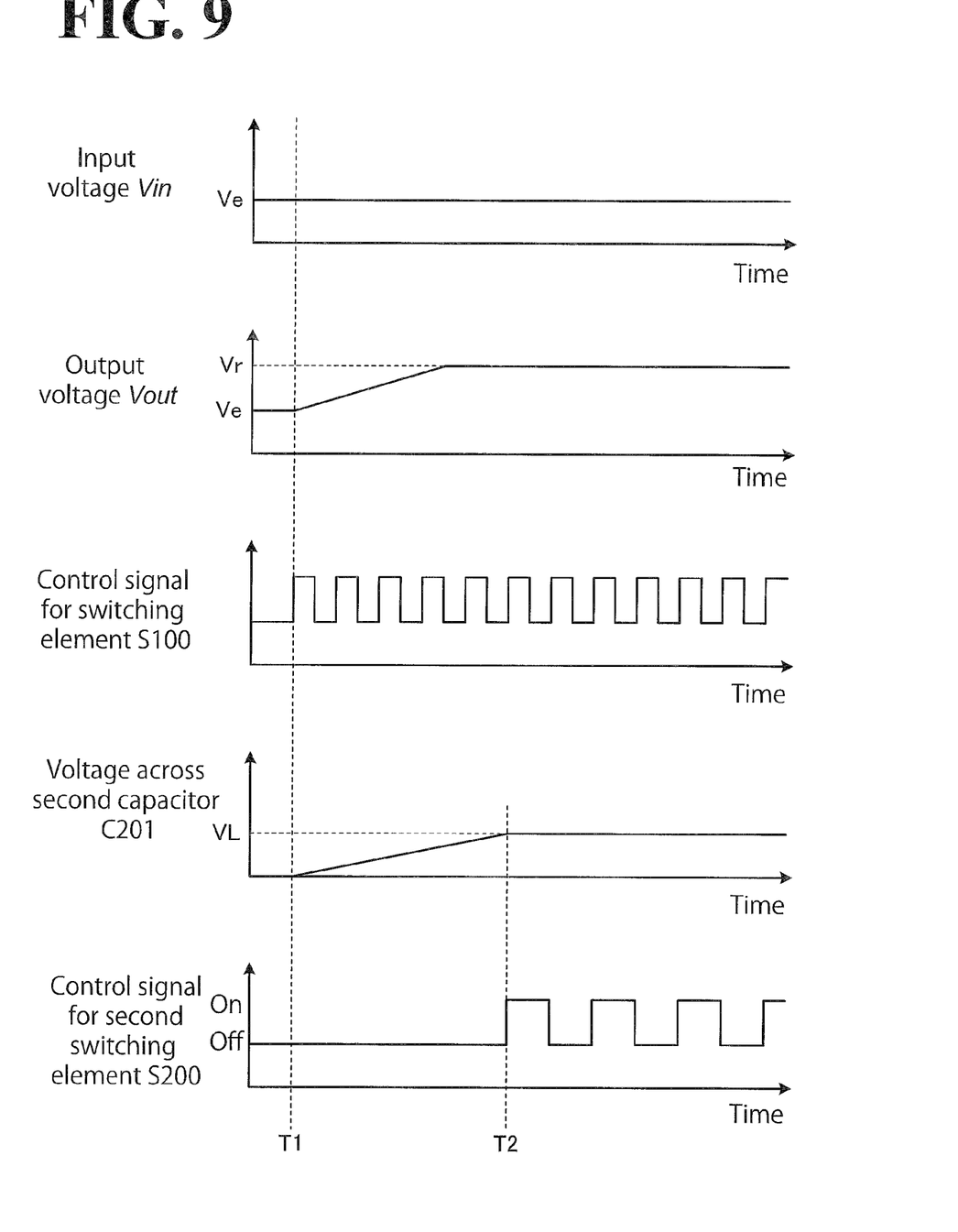
FIG. 9 illustrates input voltage and output voltage of the DC-to-DC converter according to the second embodiment, voltage across a second capacitor, a control signal of a switching element, and a control signal of the second switching element.

As illustrated in FIG. 9, the control signal that the control circuit 130 generates for the switching element S100 is a binary digital signal that alternates between high state and low state on a constant periodic basis. When the control signal for the switching element S100 is high, the switching element S100 is turned on. When the control signal for the switching element S100 is low, the switching element S100 is turned off.

The control circuit 130 applies the control signal, illustrated in FIG. 9, for the switching element S100 to the control terminal of the switching element S100 so as to control the switching element S100.

When the DC-to-DC converter 2 starts the boost operation, the snubber control circuit 210 monitors the voltage across the second capacitor C201.

Specifically, based on a detection result obtained by the voltage detection circuit (not illustrated) that has detected the voltage across the second capacitor C201, the snubber control circuit 210 determines whether the voltage across the second capacitor C201 is equal to or higher than predetermined voltage VL. A non-limiting example of the predetermined voltage VL has a value higher than the maximum amplitude value of the voltage ripple that occurs in the second reactor L102 when the switching element S100 is off.

When the voltage across the second capacitor C201 becomes equal to or higher than the predetermined voltage VL, (timing T2 illustrated in FIG. 9), the snubber control circuit 210 generates a control signal for the second switching element S201.

As illustrated in FIG. 9, the control signal for the second switching element S201 is a binary digital signal that alternates between high state and low state on a constant periodic basis. When the control signal for the second switching element S201 is high, the second switching element S201 is turned on. When the control signal for the second switching element S201 is low, the second switching element S201 is turned off.

The period over which the control signal for the second switching element S201 alternates between high state and low state, that is, the switching period (on-off period) of the second switching element S201 is longer than the switching period of the switching element S100. In the embodiment of FIG. 9, the switching period of the second switching element S201 is twice as long as the switching period of the switching element S100.

Also in the embodiment of FIG. 9, the control signal for the second switching element S201 has a constant duty ratio. It is also possible to employ PMW control.

The snubber control circuit 210 applies the control signal, illustrated in FIG. 9, for the second switching element S201 to the control terminal of the second switching element S201 so as to control the second switching element S201.

Thus, the second switching element S201 performs low-speed switching based on an instruction from the snubber control circuit 210. In this manner, the second switching element S201 repeats cycles of absorption and release of the surge voltage over a predetermined switching period. This configuration keeps the voltage across the second capacitor C201 at a voltage equal to or less than the predetermined voltage VL.

Thus, the DC-to-DC converter 2 according to this embodiment provides similar advantageous effects to the advantageous effects provided by the DC-to-DC converter 1 according to the first embodiment. In addition to the advantageous effects, the snubber circuit 200 absorbs the surge voltage. This configuration ensures stable operation of the DC-to-DC converter 2, and thus the DC-to-DC converter 2 finds a wide range of applications.

Moreover, the DC-to-DC converter 2 according to this embodiment releases the energy absorbed by the snubber circuit 200 to the positive output terminal $V_{out+}$. This configuration eliminates or minimizes energy losses in the snubber circuit 200. As a result, losses in the DC-to-DC converter 2 are eliminated or minimized.

It is noted that even though the second switching element S201 of the snubber circuit 200 performs hard switching, the DC-to-DC converter 2 as a whole is least adversely influenced by the loss caused by the hard switching. This is because the energy accumulated in the snubber circuit 200 is much smaller than the boost power of the boost chopper circuit 100.

For example, assume that the energy accumulated in the snubber circuit 200 is three percent of the rating of the DC-to-DC converter 2. If all the energy is consumed by, for example, resistance, it is impossible to obtain a 97 percent efficiency or more in the DC-to-DC converter 2 as a whole, even if the boost chopper circuit 100 achieves zero loss.

The snubber circuit 200 according to this embodiment releases the energy accumulated in the snubber circuit 200 to the positive output terminal $V_{out+}$. In this case, if a five percent loss is caused by the hard switching performed by the second switching element S201, the amount of loss in the snubber circuit 200 is 3 percent×5 percent of the rating of the DC-to-DC converter 2. Thus, the amount of loss in the snubber circuit 200 is 0.15 percent of the rating of the DC-to-DC converter 2, which indicates that the snubber circuit 200 least adversely influences the DC-to-DC converter 2 as a whole.

Thus, even though the DC-to-DC converter 2 according to this embodiment performs hard switching, the release of the energy absorbed by the snubber circuit 200 to the positive output terminal $V_{out+}$ eliminates or minimizes the loss in the DC-to-DC converter 2.

Also in this embodiment, when the voltage across the snubber circuit 200 becomes larger than the voltage ripple that occurs in the second reactor L102 when the switching element S100 is off, the second switching element S201 operates on a low-speed switching basis. This configuration ensures efficient operation of the snubber circuit 200 while keeping the snubber circuit 200 from consuming an unnecessarily large amount of power.

When the energy accumulated in the snubber circuit 200 is released, the voltage across the snubber circuit 200 decreases. If the voltage across the snubber circuit 200 degrades in large amounts, the amount of energy that corresponds to the amount of change in the voltage and that is originally tolerable in the second reactor L102 may be absorbed and processed in the snubber circuit 200. If the energy is processed in the snubber circuit 200, the loss in the snubber circuit 200 increases, creating a possibility of adverse influence on the efficiency of the DC-to-DC converter 2.

In order to eliminate or minimize the adverse influence, the predetermined voltage VL is determined to serve as a basis for the snubber control circuit 210's determination as to whether to generate the control signal for the second switching element S201. For example, the predetermined voltage VL may be determined by comprehensively taking into account considerations such as the pressure resistance that the DC-to-DC converter 2 has against the surge voltage, and the efficiency of the DC-to-DC converter 2.

In this manner, a suitable amount of voltage VL is determined. When the voltage across the snubber circuit 200 becomes larger than the voltage VL, the second switching element S201 is switched on and off periodically. This configuration enables the snubber circuit 200 to efficiently absorb the surge voltage.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A DC-to-DC converter comprising:
    an input terminal connected to a DC power source;
    an output terminal connected to a load;
    a reactor disposed between the input terminal and the output terminal;
    a blocking diode connected in series to the reactor;
    a single switch comprising one end connected between the reactor and the blocking diode;
    a boost chopper circuit configured to boost an input voltage so as to generate an output voltage;
    a first reactor disposed between the input terminal and the one end of the single switch;
    a first capacitor disposed between the first reactor and the single switch and connected in series to the first reactor; and
    a first diode comprising:
        an anode terminal connected to a connection portion at which the first reactor and the first capacitor are connected to each other; and
        a cathode terminal connected to the output terminal,
    wherein, when the single switch is in a conductive state, a current path is established in which current flows across the first capacitor and across the single switch.

2. The DC-to-DC converter according to claim 1, further comprising a second diode connected in series to the first reactor.

3. The DC-to-DC converter according to claim 2, further comprising a second reactor disposed between the blocking diode and the output terminal.

4. The DC-to-DC converter according to claim 3, further comprising a snubber circuit configured to absorb a surge voltage between the blocking diode and the second reactor.

5. The DC-to-DC converter according to claim 4, further comprising a controller configured to, when a value of a voltage across the snubber circuit becomes larger than a value of a voltage ripple that occurs in the second reactor when the single switch is off, control the snubber circuit to repeat cycles of absorption and release of the surge voltage, a period of each of the cycles being longer than an on-off period of the single switch.

6. The DC-to-DC converter according to claim 1, wherein the connection portion at which the first reactor and first capacitor are connected to each other is included in the current path.

7. The DC-to-DC converter according to claim 1, wherein the reactor, the blocking diode, and the single switch are included in the boost chopper circuit.

8. The DC-to-DC converter according to claim 1, wherein the first capacitor has an end connected between the first reactor and the first diode.

9. The DC-to-DC converter according to claim 8, wherein the first capacitor has another end connected to the single switch to switchably connect the first capacitor to a ground potential.

10. The DC-to-DC converter according to claim 1, wherein the reactor and the first reactor are connected in parallel.

11. A DC-to-DC converter comprising:
    an input terminal connected to a DC power source;
    an output terminal connected to a load;

a reactor disposed between the input terminal and the output terminal;
a blocking diode connected in series to the reactor;
a switching element comprising one end connected between the reactor and the blocking diode;
a boost chopper circuit configured to boost an input voltage so as to generate an output voltage;
a first reactor disposed between the input terminal and the one end of the switching element;
a first capacitor disposed between the first reactor and the switching element and connected in series to the first reactor;
a first diode comprising:
an anode terminal connected to a connection portion at which the first reactor and the first capacitor are connected to each other; and
a cathode terminal connected to the output terminal; and
a second reactor disposed between the blocking diode and the output terminal,
wherein, when the switching element is in a conductive state, a current path is established in which current flows across the first capacitor and across the switching element.

12. The DC-to-DC converter according to claim 11, further comprising a snubber circuit configured to absorb a surge voltage between the blocking diode and the second reactor.

13. A DC-to-DC converter comprising:
an input terminal connected to a DC power source;
an output terminal connected to a load;
a reactor disposed between the input terminal and the output terminal;
a blocking diode connected in series to the reactor;
a switching element comprising one end connected between the reactor and the blocking diode;
a boost chopper circuit configured to boost an input voltage so as to generate an output voltage;
a first reactor disposed between the input terminal and the one end of the switching element;
a first capacitor disposed between the first reactor and the switching element and connected in series to the first reactor;
a first diode comprising:
an anode terminal connected to a connection portion at which the first reactor and the first capacitor are connected to each other; and
a cathode terminal connected to the output terminal;
a second reactor disposed between the blocking diode and the output terminal;
a snubber circuit configured to absorb a surge voltage between the blocking diode and the second reactor; and
a controller configured to, when a value of a voltage across the snubber circuit becomes larger than a value of a voltage ripple that occurs in the second reactor when the switching element is off, control the snubber circuit to repeat cycles of absorption and release of the surge voltage, a period of each of the cycles being longer than an on-off period of the switching element.

14. The DC-to-DC converter according to claim 13, further comprising a second diode connected in series to the first reactor.

15. A DC-to-DC converter comprising:
a booster configured to turn on and off a single switch to switch between accumulating, in a reactor, energy supplied from a DC power source and releasing the energy from the reactor so as to boost a voltage output from the DC power source, the single switch having one end connected between the reactor and a blocking diode, the blocking diode being connected in series with the reactor; and
a voltage suppressor including a first reactor and a first capacitor, the first reactor being disposed between the input terminal and the one end of the single switch, the voltage suppressor configured to, at a turn-off time of the single switch, suppress a voltage across the single switch based on energy supplied from the DC power source when the single switch is on,
wherein, when the single switch is on, a current path is established in which current flows from the first reactor, across the first capacitor, and across the single switch.

16. The DC-to-DC converter according to claim 15,
wherein the voltage suppressor includes a first diode having an anode terminal connected to a connection portion at which the first reactor and the first capacitor are connected to each other, and
wherein the connection portion at which the first reactor and first capacitor are connected to each other is included in the current path.

17. The DC-to-DC converter according to claim 15, further comprising:
an output terminal; and
a first diode having:
an anode terminal connected to a connection portion at which the first reactor and the first capacitor are connected to each other; and
a cathode terminal connected to the output terminal,
wherein the first capacitor has an end connected between the first reactor and the first diode.

18. The DC-to-DC converter according to claim 17, wherein the first capacitor has another end connected to the single switch to switchably connect the first capacitor to a ground potential.

19. The DC-to-DC converter according to claim 15, wherein the reactor and the first reactor are connected in parallel.

20. A DC-to-DC converter comprising:
an input terminal configured to be connected to a DC power source;
an output terminal configured to be connected to a load;
a boost chopper circuit configured to boost an input voltage so as to generate an output voltage, including:
a first reactor connected between the input terminal and the output terminal;
a first diode connected in series to the reactor; and
a single switch including one end connected between the first reactor and the first diode;
a second reactor connected between the input terminal and the one end of the single switch;
a second capacitor connected between the second reactor and the single switch and connected in series to the second reactor; and
a second diode including:
an anode terminal connected to a connection portion at which the second reactor and the second capacitor are connected to each other; and
a cathode terminal connected to the output terminal,
wherein, when the single switch is in a conductive state, a current path is established in which current flows from the second reactor, across the second capacitor, and across the single switch.

21. The DC-to-DC converter according to claim 20, wherein the first reactor and the second reactor are connected in parallel.

\* \* \* \* \*